United States Patent
Shook

[11] 3,922,018
[45] Nov. 25, 1975

[54] SEPARABLE BEARING AXLE ASSEMBLY AND SUPPORTED HUB OF A BICYCLE WHEEL OR THE LIKE

[75] Inventor: William B. Shook, Columbus

[73] Assignee: Thurston, Inc., Columbus, Ohio

[22] Filed: Dec. 18, 1974

[21] Appl. No.: 533,885

[52] U.S. Cl. ............................. 301/105 B; 308/192
[51] Int. Cl.² ........................................ B60B 27/00
[58] Field of Search ................. 301/105 B; 308/192

[56] References Cited
FOREIGN PATENTS OR APPLICATIONS
1,014,109  5/1952  France ............................. 308/192

Primary Examiner—M. Henson Wood, Jr.
Assistant Examiner—D. W. Keen
Attorney, Agent, or Firm—Mahoney, Miller & Stebens

[57] ABSTRACT

A hub of a bicycle wheel or the like rotatably mounted on an axle and bearing assembly. The assembly consists of an axle and bearings for supporting the specially formed hub which are separable but are ordinarily kept in assembled condition in the hub by a quick-release cam lock or clamp.

6 Claims, 5 Drawing Figures

SEPARABLE BEARING AXLE ASSEMBLY AND SUPPORTED HUB OF A BICYCLE WHEEL OR THE LIKE

BACKGROUND AND SUMMARY OF THE INVENTION

Various types of axle and bearing assemblies for the hubs of bicycle wheels or the like have been provided in the past but usually have been of such a nature that they are difficult to take apart for cleaning and lubricating. Also, these prior art assemblies have usually been adjustable and require precise adjustment so they are not too tight or too loose. Also, these prior art assemblies usually require specially designed, difficult to install, seals which have a tendency to wear.

The present invention overcomes the difficulties of prior art assemblies by providing an axle and bearing assembly made of separable parts that will fit into the specially formed hub, which can be assembled easily and can be disassembled readily at any time for purposes of cleaning and lubricating. The assembly is held together in the hub by a quick-release clamp which cooperates with the parts in such a manner as to locate them in proper relative operative positions accurately and without need for adjustment. Also, the parts fit together in the hub in such a precise cooperative manner that no seals are required.

BRIEF DESCRIPTION OF THE DRAWINGS

The best mode contemplated in carrying out this invention is illustrated in the accompanying drawings in which.

DETAILED DESCRIPTION OF THE INVENTION

Figure 1:
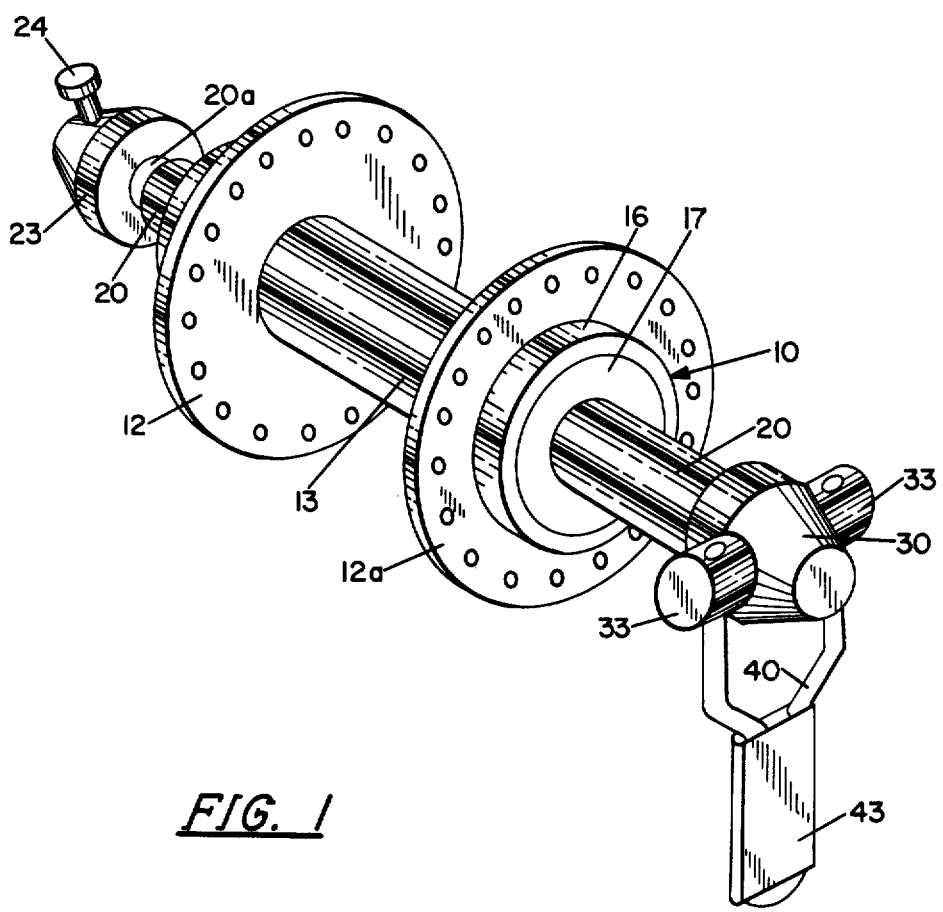
FIG. 1 is a perspective view of the assembly, without the spokes and rim of the wheel.

With reference to the drawings the bearings and axle and supported hub assembly of this invention is illustrated generally by the reference character 10. The hub is part of the complete wheel (not shown) which may be a bicycle wheel, although it is not necessarily limited to this specific wheel. As previously indicated, this assembly is composed of various parts which can be readily assembled and most of which can be readily separated for cleaning and lubricating. The assembly may be at, for example, the front or rear of a bicycle and will have the same basic parts carried by the associated wheelsupporting fork F of the frame.

The hub shown is for the rear wheel and consists of a pair of collars 12 and 12a which are spaced axially by a concentric sleeve 13. The ends of the sleeve have a snug fit in inwardly opening sockets 14 and 14a of the respective collars. The collars are provided with the respective radial flanges 15 and 15a which have transverse openings extending therethrough for receiving the wire spokes W of the wheel in the usual manner. The collar 12 is shown with a threaded portion 19 which is used in mounting the usual sprocket unit. The ends of the spacer sleeve 13 are secured in the sockets 14 and 14a by any suitable means such as by adhesive. Thus, there is provided a hub consisting of the collars 12 and 12a and the spacer sleeve 13 which will be a part of the assembled wheel.

Figure 2:
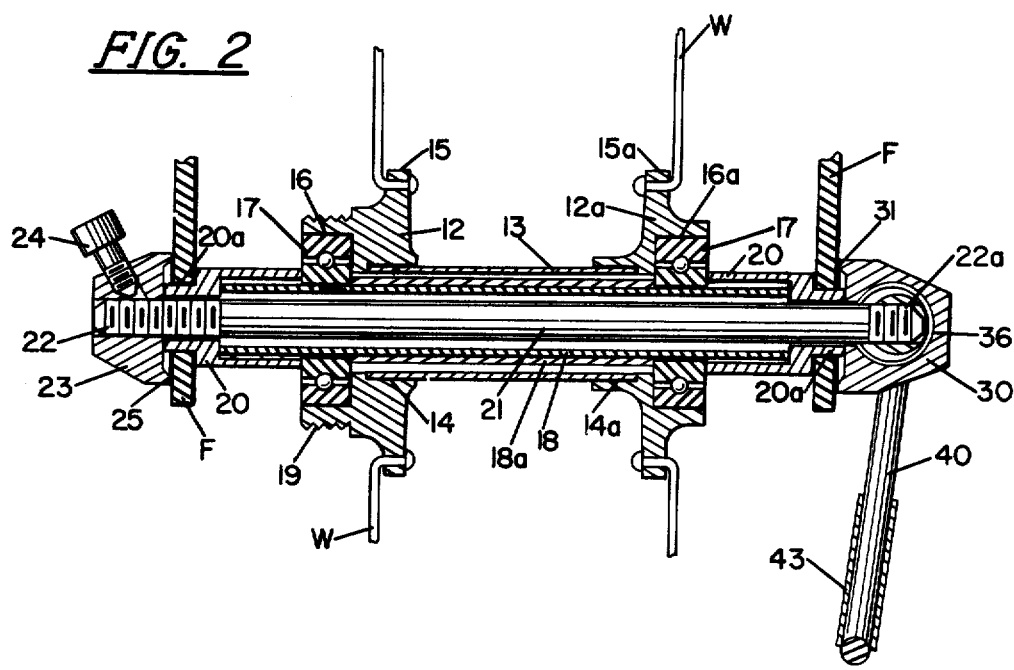
FIG. 2 is an axial sectional view of the assembly on the wheel, which is partially shown, mounted in the support forks of a bicycle frame.
Figure 3:
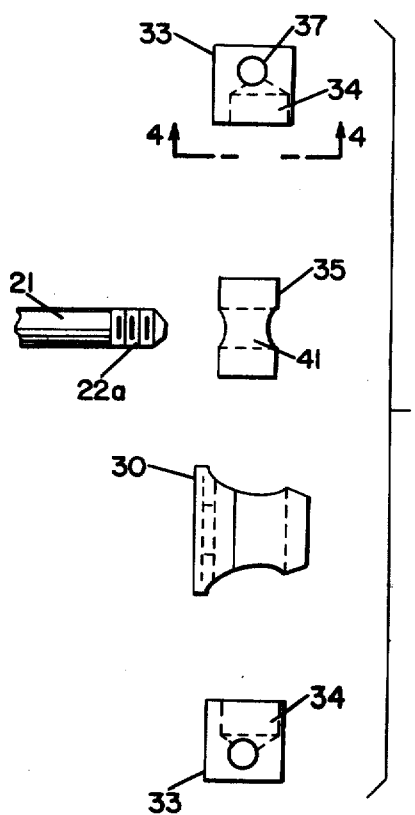
FIG. 3 is an elevational view of various parts of the quick-release clamp.
Figure 4:
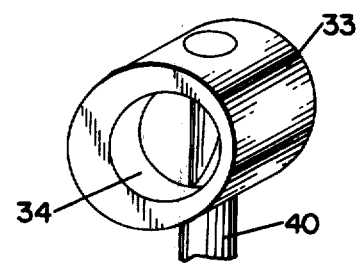
FIG. 4 is a view of one of the eccentric socket members of the clamp taken from the position indicated at line 4—4 of FIG. 3.
Figure 5:
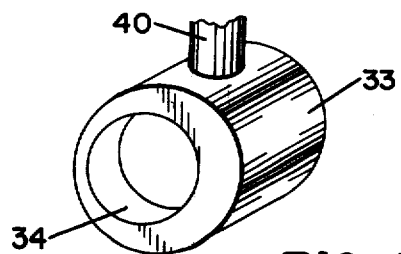
FIG. 5 is a similar view of the eccentric socket member rotated 180°.

The collars 12 and 12a are further provided with the outwardly-opening concentric bearing-receiving sockets 16 and 16a which receive identical ball-bearing units 17. These bearing units fit snugly within their respective sockets but may be readily slipped axially into and out of the sockets. A spacer sleeve 18a is fitted within the sleeve 13 and snugly over the axle 18 and associated collars 12 and 12a, spaced slightly therefrom, and its opposed ends engage the inner races of the respective bearing units. An axle sleeve 18 extends axially through the spacer sleeve 18a and the aligned bearing units 17 and has opposed ends projecting outwardly from those bearings. It will be noted that the axle sleeve 18 is of sufficient length that its opposed ends project substantially from the bearing units 17. These projecting ends receive, respectively, the two spacer cups 20. These cups slip axially on and off the projecting ends of the sleeve 18. Before clamping the parts axially together the inner extremities of the skirts of cups 20 will be spaced slightly from the bearing units but at the same time the ends of the sleeve 18 will be in contact with the closed ends of the cups (FIG. 2). However, in their final positions on the sleeve 18, the inner extremities of the skirts of the cups 20 will be forced into engagement with the inner races of the respective bearing units 17. This will be permitted by slight axial contraction of the metal of the cups 20 and sleeve 18 upon clamping. Also, it will be noted that the inner race of each bearing unit engages the end of spacer sleeve 18a to prevent binding in the wall of the socket 16. Each cup 20 has an outwardly projecting reduced extension 20a which is to be positioned in a supporting fork F of the bicycle frame.

The parts of the assembly so far described are normally held in cooperative relationship on the forks F as illustrated in FIG. 2 by a quick-release clamp unit. This unit consists of the parts illustrated in the various Figures assembled in the manner illustrated in FIG. 2. These parts include a tension rod 21 which is adapted to be extended axially through the axle sleeve 18, after such sleeve has been positioned within the bearings 17, which have been previously slipped into the sockets 16 of the hub and within spacer sleeve 18a. Also, the spacer cups 20 have been previously slipped on the projecting ends of the sleeve 18. The rod 21 is of sufficient length that it will project axially outwardly from the spacer cups 20 at each end and these ends are threaded as indicated at 22 and 22a. The threaded end 22 receives a thrust nut 23 screwed thereon and which may be held in place by a set-screw 24. This nut has an inner annular peripheral lip 25 which is adapted to clamp against the adjacent outer surface of fork F.

The opposite end of the rod 21 carries the cam means which is adapted to exert a pull on the rod 21 to draw all the axially disposed parts, so far described, into cooperative relationship. This means includes a cap 30 which is mounted on the adjacent projecting end 22a of the rod 21 and which, like the cap 23, is provided with an inner lip 31 which is adapted to clamp against the adjacent outer surface of fork F. The cap 30 is provided with a transverse bore 36 which receives a pair of opposed eccentric socket members 33 which have the inwardly opening eccentric sockets 34 that slip over the opposed cylindrical ends of a connecting member 35. The members 33 are slipped over the opposed ends of member 35 and this assembly is slipped into the transverse cap bore 36. This will dispose the two members 33 with their ends projecting outwardly in opposite directions from the bore. It will be noted that each of the projecting ends has a handle-receiving bore 37 disposed transversely relative to the associated eccentric socket 34. These bores 37 will receive the inner ends of a spring-clip handle 40, the arms of which will tend to spring inwardly together to hold the eccentric socket members on the connecting member 35 in the cap bore 36. The outer portion of handle 40 is enclosed by a cover 43 to facilitate gripping and to position the inner ends of the arms in predetermined spaced relationship. It will be noted that connecting member 35 has a radial bore 41 which is threaded to receive the adjacent threaded end 22a of the rod 21 when it is aligned with an axial bore 42, in the cap 30, which extends axially from the flat inner surface thereof into the bore 36. Threads 22a terminate at a predetermined point to prevent the outer end of rod 21 from projecting through bore 41.

It will be apparent that swinging the handle 40 in or out will result in the eccentric socket members 33 rotating in the bore 36 of cap 30. Inward swinging of the handle will exert a pull on the rod 21 which will cause the caps 23 and 30 to press axially inwardly into engagement with the respective forks F which will be disposed around the projections 20a of the cups 20. The cups 20 will be held against the bearing units 17 which, in turn will be held against the ends of the spacer sleeve 18a. The axle 18 will be held axially between the cups 20. Thus, all the assembly will be clamped to the forks F and all the parts thereof will be held in proper cooperative relationship. The cam lock will be self-locking as the handle 40 is swung inwardly beyond center to snap into locking position. Quick-release of these parts will occur when the handle 40 is positively swung outwardly, then, the cap 30 can be screwed off the rod 21 to permit withdrawal of the rod 21, to permit removal of the wheel from the forks F, and then separation of the parts of the assembly by axial separation of cups 20, axle 18, bearings 17 and sleeve 18a from the hub.

It will be apparent that this invention provides a simple axle and bearing assembly for supporting the hub on the frame forks which permits quick mounting on and removal from the forks. It also permits quick removal of the parts from the hub and separation for cleaning and lubricating. The assembly will be locked in place with the parts properly positioned relative to each other without adjustment. No additional seals are necessary with resultant disadvantages.

Having thus described the invention, what is claimed is:

1. A wheel-supporting assembly comprising a hub having a central sleeve and outwardly-opening concentric bearing-receiving sockets at its opposed ends, concentric bearing units slipped into said sockets, a spacer sleeve concentric within the central sleeve into which it is slipped and having opposed ends engage the bearing units, an axle sleeve slipped through said spacer sleeve and the aligned bearing units and having its ends projecting outwardly from the respective bearing units, concentric cups disposed on the outer ends of said axle sleeve and having inwardly projecting skirts for engagement with the respective bearing units, each of said cups having portions fitting into mounting openings in wheel-supporting frame members, and means for holding the assembled parts axially together and within said members.

2. An assembly according to claim 1 in which said last named means comprises a rod extending through said axle assembly and said caps and having its opposite ends projecting therefrom, said end having thrust caps mounted thereon for axial adjustment towards and from each other so that they can be moved into engagement with the respective frame members to clamp them between the adjacent cups and caps.

3. An assembly according to claim 2 in which said rod and cap are part of a quick-release clamp, said clamp having one of the caps fixed thereon at one end against axial movement and the second cap mounted thereon for axial movement.

4. An assembly according to claim 3 in which both caps carry threaded sockets receiving threaded ends of the rod the second cap having its threaded socket in an eccentric mounted for rotation in a transverse bore within the cap.

5. An assembly according to claim 4 in which the eccentric in the transverse bore consists of a pair of opposed eccentric members rotatably mounted in the bore, said rod slidably extending into the cap and the bore thereof and being threaded into a transverse connecting member disposed axially within the bore and on which said eccentrics are rotatably mounted, and a handle connected to said eccentrics for rotating them simultaneously within the cap bore to move the cap axially of the rod and into engagement with the adjacent frame member.

6. An assembly according to claim 2 in which before clamping the cup skirts are axially spaced from the bearing units and the ends of the axle sleeve are in contact with the closed ends of the cups but after clamping the skirts of the cups are in contact with the bearing units.

* * * * *